(12) United States Patent
Jeong

(10) Patent No.: US 6,307,717 B1
(45) Date of Patent: *Oct. 23, 2001

(54) METHOD OF ASSEMBLING VOICE COIL IN AN ACTUATOR ASSEMBLY OF A HARD DISK DRIVE

(75) Inventor: Woo-Cheol Jeong, Seoul (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,450

(22) Filed: Mar. 25, 1998

(30) Foreign Application Priority Data

Mar. 25, 1997 (KR) .................................. 97-10325

(51) Int. Cl.[7] ...................................................... G11B 21/08
(52) U.S. Cl. ............................................................ 360/265.8
(58) Field of Search .................................. 360/104, 105, 360/106, 265.8; 29/603.04

(56) References Cited

U.S. PATENT DOCUMENTS

| | | | |
|---|---|---|---|
| 4,879,617 | * 11/1989 | Sampietro et al. .................. | 360/106 |
| 5,122,703 | * 6/1992 | Takahashi et al. .................. | 360/107 |
| 5,168,185 | * 12/1992 | Umehara et al. .................... | 360/106 |
| 5,179,482 | * 1/1993 | Tanaka et al. ....................... | 360/106 |
| 5,305,169 | * 4/1994 | Anderson et al. ................... | 360/106 |
| 5,528,091 | * 6/1996 | Loubier et al. ........................ | 310/13 |
| 5,623,759 | * 4/1997 | Thorson et al. .................... | 360/106 |
| 5,650,896 | * 7/1997 | Viskochil ............................. | 360/106 |
| 5,656,877 | * 8/1997 | Loubier et al. ........................ | 310/13 |

\* cited by examiner

Primary Examiner—David Davis
(74) Attorney, Agent, or Firm—Robert E. Bushnell, Esq.

(57) ABSTRACT

An actuator assembly in a disk drive includes an actuator arm having a first distal end supporting a transducer head and a second distal end opposite to said first distal end supporting a movable voice coil section of a voice coil motor. The voice coil section comprises a coil, inner and outer bobbins positioned respectively at inner and outer sides of the coil, and a plurality of coil guides installed at respective corners of the inner bobbin for fixedly guiding the coil so as to prevent distortion due to difference in thermal expansion coefficients between the plastic bobbins and the coil during insertion molding in order to enhance a combining force between the coil and the bobbins. A gap of at least 0.5 mm is formed between the coil guides and the coil for separating the coil from the coil guides to prevent damages due to friction therefrom. The inner bobbin further comprises a plurality of guide holes perforated at corners for mounting the coil guides.

29 Claims, 8 Drawing Sheets

METHOD OF ASSEMBLING VOICE COIL IN AN ACTUATOR ASSEMBLY OF A HARD DISK DRIVE

CLAIM FOR PRIORITY

This application makes reference to, incorporates the same herein, and claims all benefits accruing under 35 U.S.C. §119 from an application for METHOD AND DEVICE FOR FIXING COIL OF ACTUATOR IN HARD DISK DRIVE earlier filed in the Korean Industrial Property Office on the Mar. 25, 1997, and there duly assigned Ser. No. 10325/1997, a copy of which application is annexed hereto.

BACKGROUND OF THE INVENTION

1. Technical Field

The present invention relates to alignment of a voice coil in an actuator assembly of a hard disk drive, and more particularly to a method of fixing a voice coil in an actuator assembly to reduce distortion of the coil during insertion molding in order to maximize a recording density of a recording medium.

2. Related Art

Computers often include auxiliary memory storage units having media on which data can be written and from which data can be read for later use. Hard disk drives incorporating stacked, commonly rotated rigid magnetic disks are used for storage of data in magnetic form on the disk surfaces. Such hard disk drives typically include a motor drive spindle and associated actuator assembly for receiving and rotating a disk at a predetermined constant speed, a servo control mechanism for radially positioning a read/write transducer head in response to track position commands, and electronic circuitry for operating the motor to provide data to and read data from the disk. Some disk drives are designed with only one read/write transducer head while others are designed with a plurality of transducer heads for enabling data to be written onto and read from a plurality of corresponding disks.

High performance disk drive systems use a moving coil actuator assembly for positioning the transducer heads over a storage disk. Voice coil motor is adapted to move the actuator arm along a radial line with respect to the storage disk. Typical voice coil motor construction comprises a loop of coil (wire) containing numerous windings physically located between one or more permanent magnets. The windings are supported by and encircle a bobbin shaped in accordance with the permanent magnet dimensions. The wire loop of the voice coil contains electrical connections which enable the coil to carry a current for generating a magnetic field which interacts with the field of the permanently mounted permanent magnets to create necessary torque to move the actuator arm across the surface of the storage disk. The torque of a moving coil actuator is obtained by multiplying the force acting on the voice coil by a distance of the coil from a pivot axis. However, when the actuator is assembled, the distance of the coil from the pivot axis is inevitably shorter than designed, and the effective length of the coil is reduced due to the distortion of the coil. As a result, the torque acting on the voice coil motor is reduced, and the efficiency of the actuator is concomitantly diminished, which, in turn, decrease the performance and reliability of high performance disk drive.

SUMMARY OF THE INVENTION

Accordingly, it is therefore an object of the present invention to provide an improved voice coil motor for operations of a high performance disk drive.

It is also an object to provide a method for improving operation efficiency of a voice coil motor of an actuator assembly by reducing tolerance generated during assembling a voice coil.

It is further an object to provide an actuator assembly using metallic coil guides, and a bobbin for fixing the position of a voice coil in the actuator assembly to prevent distortion generated due to the difference in thermal expansion coefficients between the plastic bobbin and the metallic voice coil during insertion molding, and to enhance combining force between the coil and the bobbin.

These and other objects of the present invention may be achieved by an actuator assembly of a disk drive, comprising an actuator arm having a first distal end supporting a transducer head and a second distal end opposite to said first distal end supporting a movable voice coil section of a voice coil motor. The voice coil section comprises a coil, inner and outer bobbins positioned respectively at inner and outer sides of the coil, and a plurality of coil guides installed at respective corners of the inner bobbin for fixedly guiding the coil so as to prevent distortion due to difference in thermal expansion coefficients between the plastic bobbins and the coil during insertion molding in order to enhance a combining force between the coil and the bobbins. A gap of at least 0.5 mm is formed between the coil guides and the coil for separating the coil from the coil guides to prevent damages due to friction therefrom. The inner bobbin further comprises a plurality of guide holes perforated at corners for mounting the coil guides.

In accordance with another aspect of the present invention, the actuator assembly having a coil affixed by a series of steps of: preparing a mold for insertion molding an actuator arm having a first distal end supporting a transducer head and a second distal end opposite to the first distal end supporting a movable voice coil section of a voice coil motor; installing a plurality of coil guides on the mold, where respective corners of an inner bobbin supporting the coil are to be insertion molded, for fixing the position of the coil as the coil winds around the inner bobbin and restricting distortion of the coil and the inner bobbin; and insertion molding the actuator arm including the movable voice coil section, wherein the movable voice coil section is consisted of the inner bobbin, the coil wound around the inner bobbin but separated from the inner bobbin by a gap of 0.5 mm to prevent damages due to friction, and an outer bobbin for coil protection.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
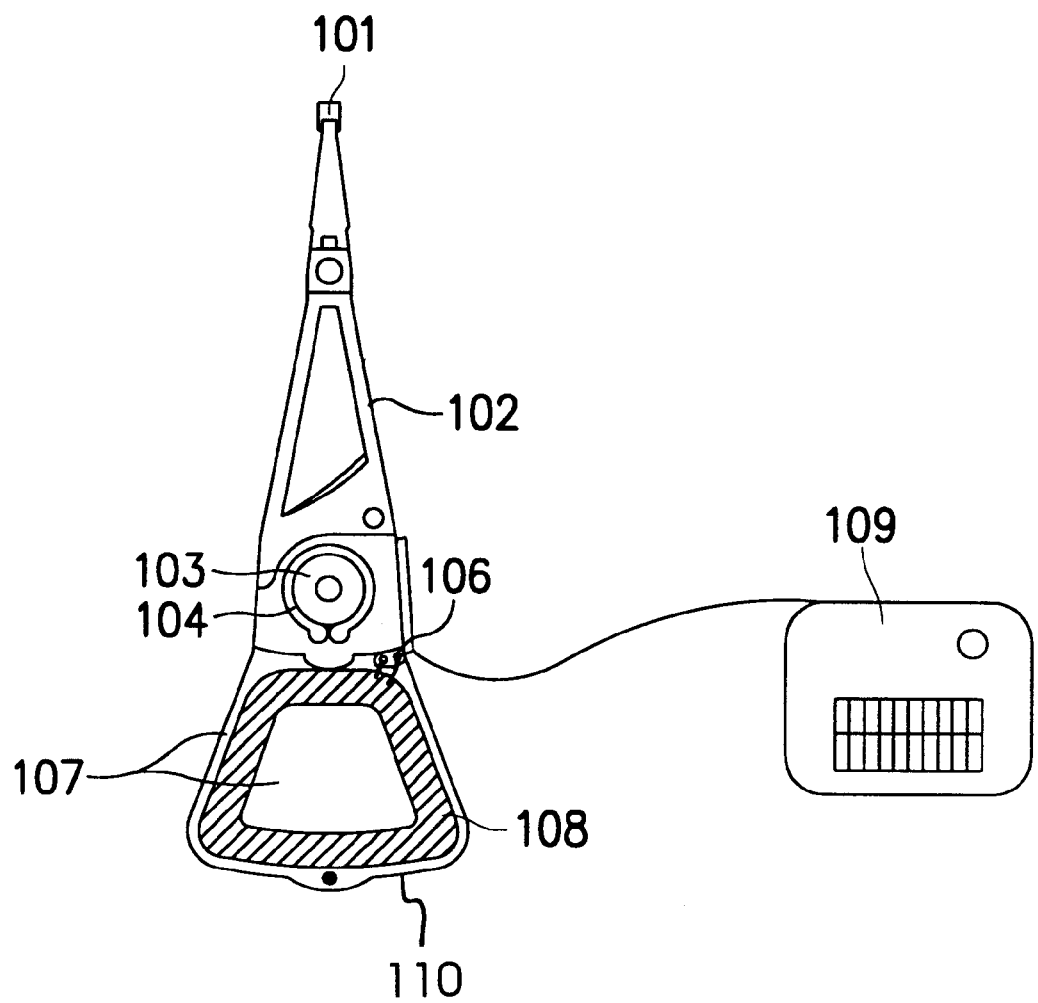
FIG. 1 is a plan view of an actuator assembly of a HDD.
Figure 2:
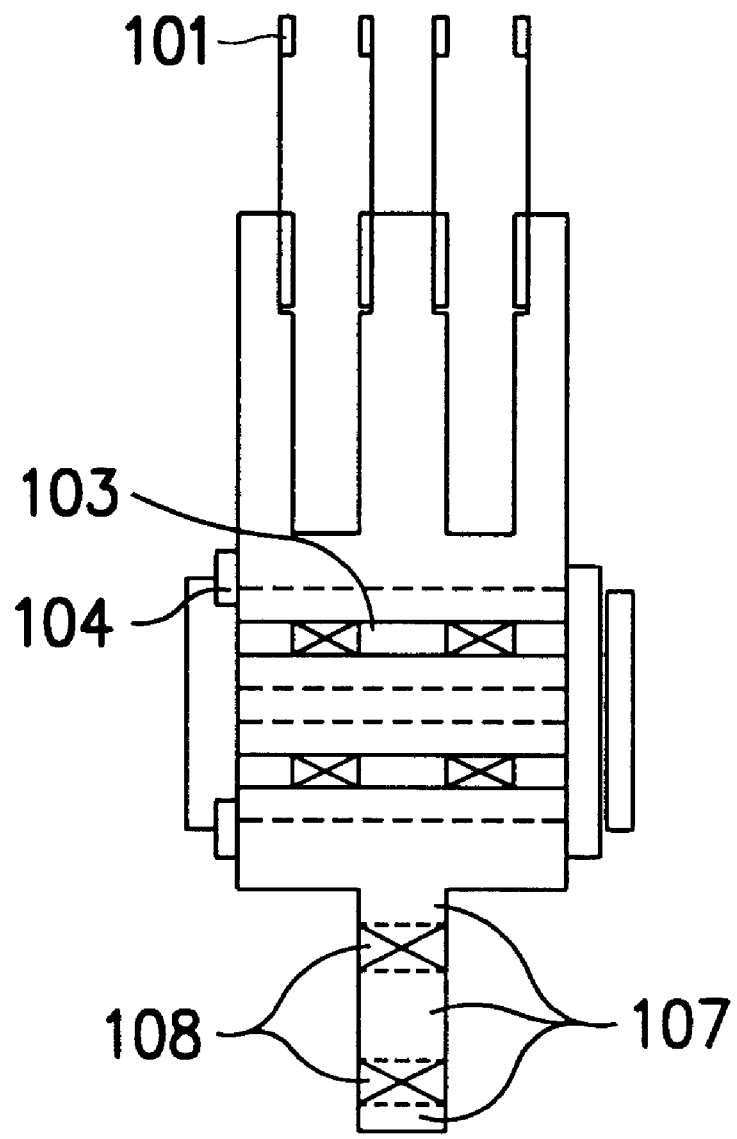
FIG. 2 is a cross-sectional view of the actuator assembly as shown in FIG. 1.

Referring now to the drawings and particularly to FIGS. 1 and 2 which are plan and cross-sectional views of an actuator assembly, respectively. Referring to FIGS. 1 and 2, the actuator assembly includes a transducer head 101 mounted on a distal end of an actuator arm 102, a pivot bearing 103 mounted by an O-shaped ring 104, and an electrical coil 108 which is wound around a bobbin 107 to constitute a movable section 110 of a voice coil motor. The coil 108 is connected to an electrical terminal 106 to receive a drive current from an electrical generator 109 for creating a driving force to move the transducer head 101.

Figure 3:
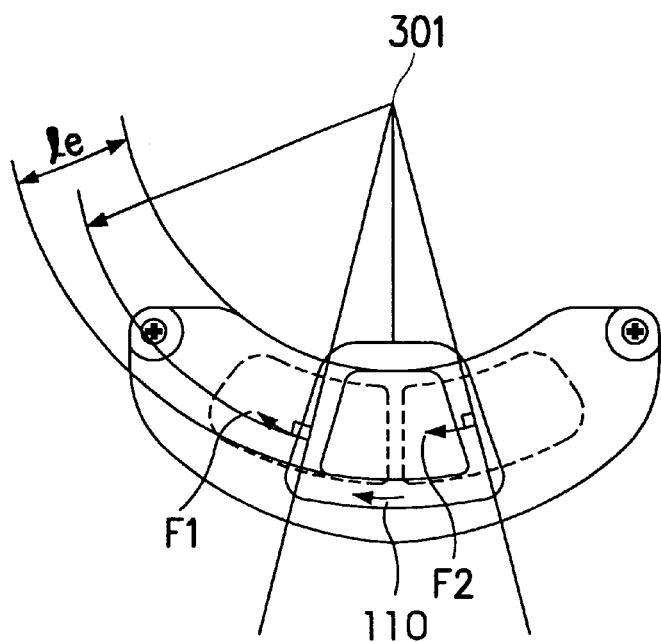
FIG. 3 is a schematic view of a voice coil motor for driving the actuator assembly.

FIG. 3 is a schematic view of a voice coil motor for driving the actuator assembly. The voice coil motor has a fixed section opposite to the movable section 110 of the actuator assembly, and derives its driving force from electromagnetic interaction between the movable section 110 of the actuator assembly and the fixed section. This driving force acts so as to rotate the movable section 110 of the actuator assembly around its pivot bearing 103 (see FIG. 1) in the direction of an arrow. As a result, the actuator arm 102, which is integrated with the movable section 110, rotates around the pivot bearing 103 to swing the transducer head 101 across the surface of a storage disk. The range of this swing motion corresponds to the region of the cylinder used by the storage disk.

Figure 4:
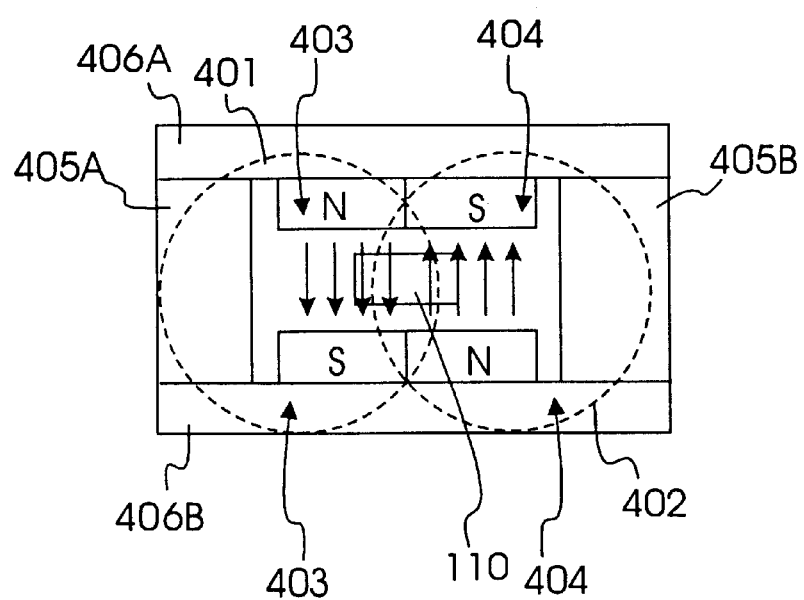
FIG. 4 is a schematic view illustrating an operation of the voice coil in the voice coil motor.

FIG. 4 is a schematic view illustrating an operation of the voice coil 108 in the voice coil motor. As shown in FIG. 4, the fixed section of the voice coil motor constitutes a magnetic circuit consisting of yokes 405A, 405B, 406A and 406B, and magnets 403, 404. The yokes 405A, 405B, 406A and 406B constitute a rectangular box shape, and two pairs of magnets 403, 404 are stuck to the upper yoke 406A and the lower yoke 406B, respectively. The magnets 403, 404 each faces its upper side of trapezoid to the pivot bearing 103, and are in contact with each other on one of the oblique sides. The directions of the poles of the magnets 403, 404 are vertical with respect to the face, and attached to the yokes 405A, 405B, 406A and 406B. The facing poles of each pair of opposite magnets 403, 404 are reverse to each other, creating a strong magnetic field in the space. The movable section 110 is in the magnetic field formed by the magnetic circuit. The driving force of the voice coil motor is generated by the magnetic field created by the magnetic circuit and the current flowing the oblique sides of the coil 108 so as to rotate the movable section 110.

In particular, the current flows in the arrow direction of a circle 401 as shown in FIG. 4 in response to electrical application from the electrical generator 109. Force F1 acts on the coil 108 placed in perpendicular to a space flux Bg in the circle 401, based on Fleming's left-hand rule. Meanwhile, force F2 acts on the coil 108 placed in a space flux direction indicated by circle 402. In rotary-type voice coil motor, a rotational torque T around a pivot bearing axis can be expressed by:

$$T = r \times F \quad (1)$$

The torque T drives the actuator arm 102. The voice coil motor is driven by using vector sum of the forces (F1 and F2) acting on the respective coils 108 placed at circles 401 and 402, thereby moving the actuator arm 102. In order to increase the operation efficiency, it is necessary to increase the torque T caused by the force acting on the coil 108 placed in the magnetic field. The force F acting on the coil 18 placed in the magnetic field can be expressed by:

$$F \, 2NiBgle \quad (2)$$

where N represents the number of turns of the coil 108; I represents a drive current; Bg represents the strength of space flux; and 1e represents the length of effective field.

Figure 5:
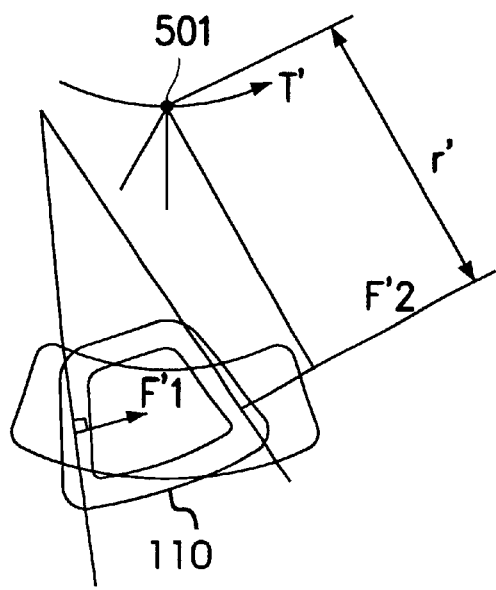
FIG. 5 illustrates a typical voice coil arrangement.
Figure 6:
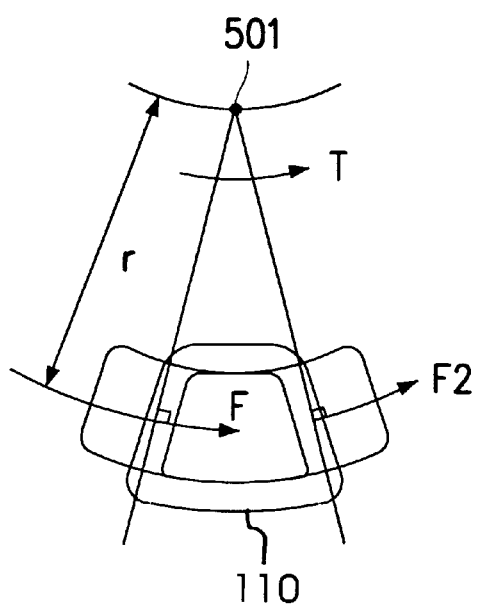
FIG. 6 illustrates a voice coil arrangement according to an embodiment of the present invention.

Therefore, the torque (T=r×F) driving the actuator is obtained by multiplying the force F by a distance r from the pivot bearing 103 to the coil 108 placed in the magnetic field. A tolerance generated in such an actuator assembly causes a working radius to be less than a designed value in driving the voice coil motor. As a result, the torque acting on the voice coil motor is reduced (See FIG. 5). This is because, as illustrated in FIGS. 5 and 6, the effective length of the coil 108 is reduced due to the distortion of the coil 108 caused by the tolerance, causing that F'1<F1, F'2<F2. Furthermore, the effective distance from the pivot bearing 103 to the coil 108 is reduced to r'<r so that the driving torque generated by the voice coil motor becomes T'<T.

Figure 7A:
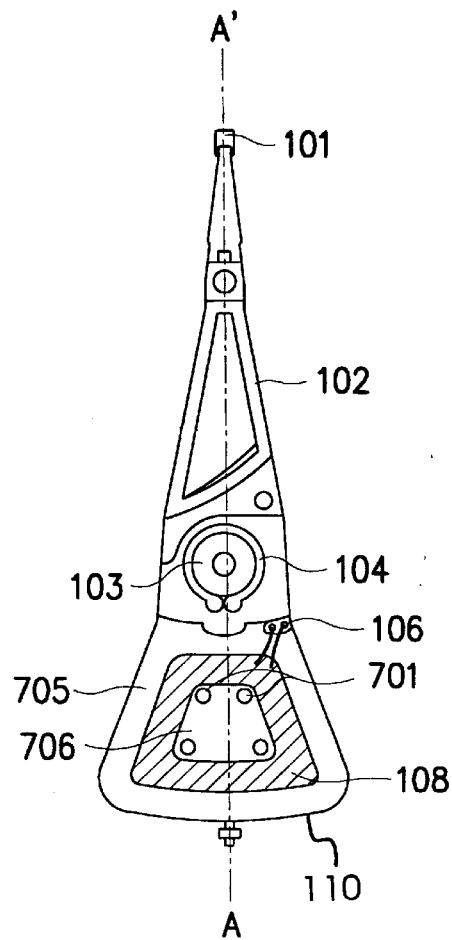
FIG. 7A is a plan view of an actuator assembly of a HDD according to an embodiment of the present invention.
Figure 7B:
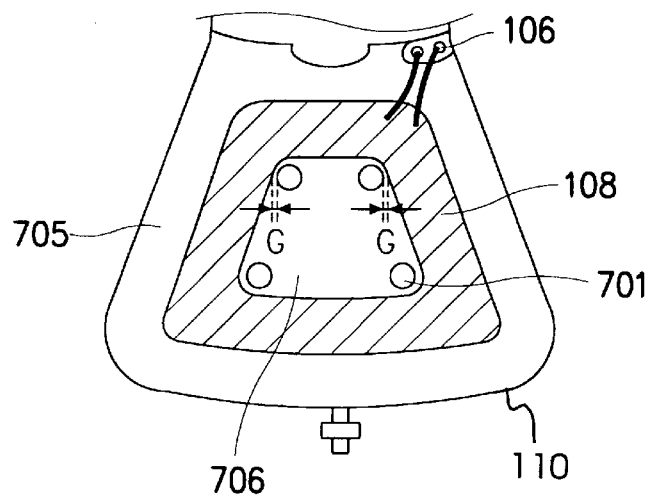
FIG. 7B is a partially enlarged plan view of a voice coil of the actuator assembly as shown in FIG. 7A.
Figure 8:
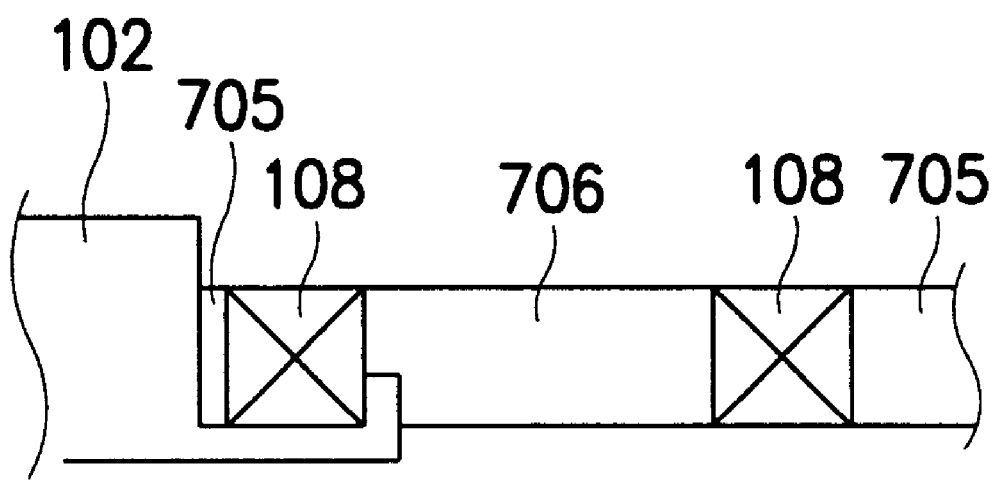
FIG. 8 is a cross-sectional view of the voice coil of the actuator assembly according to an embodiment of the present invention.

Turning now to FIGS. 7A and 7B, which illustrates a voice coil construction of an actuator assembly according to the principles of the present invention. As shown in FIGS. 7A and 7B, the voice coil construction includes four metallic coil guides 701 formed at the respective corners of an inner bobbin 706. Namely, an actuator arm 102 is placed on a mold (not shown), and four protruded metallic coil guides 701 are fixedly formed at the respective corners at which the inner bobbin 706 for the coil 108 is formed. Thereafter, during the injection molding, the inner and outer bobbins 706 and 705 made of plastic are injection-molded together with the coil 108. A process for assembling the four metallic coil guides 801 and the coil 108 is well described with reference to FIGS. 9A through 9D.

An embodiment of the present invention will be described in detail with reference to FIGS. 6 through 9D hereinbelow. The present invention is directed to substituting protruded metallic coil guides for a typical inner bobbin used for fixing the position of the coil 108 in the voice coil motor. The metallic coil guides are carefully designed to guide and fix the position of the coil 108, and may be integrated in a unitary structure of an actuator assembly or separate therefrom with a mold 800 for insertion molding.

Figure 9A:
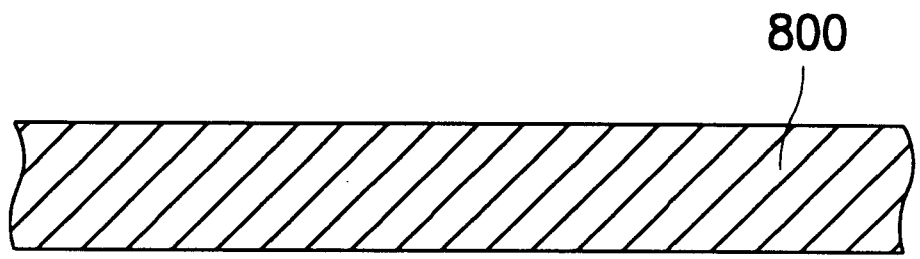
FIGS. 9A through 9D are views illustrating a process for assembling the actuator assembly according to an embodiment of the present invention.
Figure 9B:
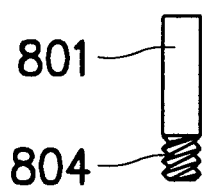
Figure 9B:
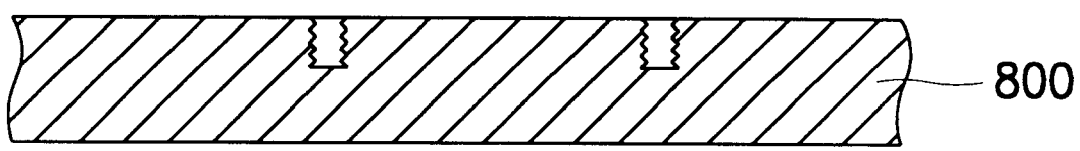
Figure 9C:
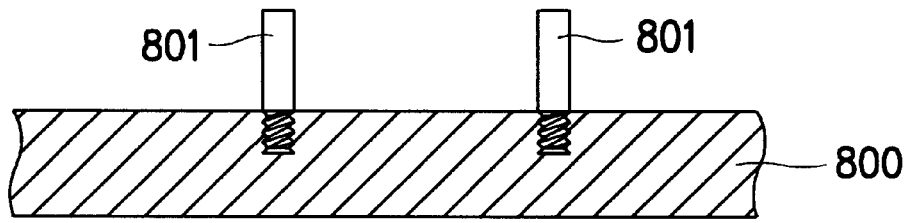
Figure 9D:
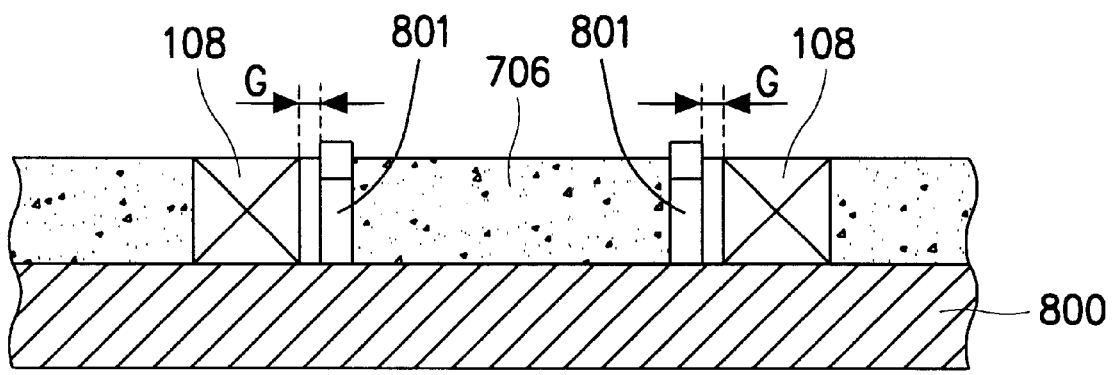

When the metallic coil guides are integrated in a unitary structure of an actuator assembly as shown in FIGS. 7A and 7B, an actuator arm (not shown) is placed on a mold 800 as illustrated in FIG. 9A for insertion molding. Then, four protruded metallic coil guides 801 each having a screw thread portion 804 formed at an end thereof are screwed in the mold 800 at four corners where an inner bobbin 706 of the coil 108 is formed as shown in FIGS. 9B and 9C. Also formed on the four corners of the inner bobbin 706 are guide holes having screw thread formed on an inner wall thereof so that guide holes can be engaged with the screw thread portion 804 of the four metallic coil guides 801. A gap G of about 0.5 mm is preferably maintained between the metallic coil guides 701 and the coil 108 as shown in FIG. 7B, so as to prevent the coil 108 from being damaged due to friction between the metallic coil guides 701 and the coil 108. The coil 108 is disposed between the inner bobbin 706 and an outer bobbin 705. Thereafter, as illustrated in FIG. 9D, the plastic bobbins 705 and 706 are injection-molded together with the coil 108. The distortion by contraction and expansion due to the difference in thermal expansion coefficients of the plastic bobbins and the metallic coil 108 during insertion (or injection) molding is prevented by the metallic coil guides 801, so that deformation degree of the inner and outer bobbins 706 and 705 after cooling them can be minimized. Reduction of the distortion improves a combining force between the coil 108 and the inner and outer bobbins 706 and 705, thereby increasing a resonance frequency of the actuator. The resonance frequency can be expressed by:

$$f \propto \sqrt{k/m} \qquad (3)$$

where f represents a resonance frequency; k represents a stiffness value; and m represents an equivalent mass. It is understood from the foregoing description that an increase of the combining force between the coil 108 and the bobbins 705 and 706 causes reduction of the distortion.

As described above, the present invention has an advantage that an increase of the combining force between the coil 108 and the inner and outer bobbins 706 and 705 increases the stiffness k, which results into an increase of the resonance frequency f. Consequently, the servo bandwidth may be increased and the recording density of the auxiliary memory may also be increased.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An actuator assembly, comprising:
   an actuator arm having a distal end;
   a voice coil member having a voice coil, said voice coil member molded into and fixed to a side wall of said distal end;
   an inner bobbin made of a first insertion-molding material and positioned at and formed on an inner side of said voice coil when said voice coil member is molded into and fixed to said distal end;
   an outer bobbin made of a second insertion-molding material and formed on an entire circumferential outer side of said voice coil without covering a top surface of said voice coil when said voice coil member is molded into and fixed to said distal end, having a portion disposed between said circumferential outer side of said voice coil and said side wall of said distal end to fix said voice coil member to said side wall of said distal end, said portion having the same height as said voice coil;
   a plurality of holes formed at outer corners of said inner bobbin when said voice coil member is molded into and fixed to said distal end; and
   an elongated portion formed on said distal end, extending across a bottom side of said outer bobbin and partially across said coil and said inner bobbin, with an extreme portion of said elongated portion protruding between said coil and said inner bobbin and holding said voice coil member to said distal end of said actuator arm.

2. The actuator assembly of claim 1, further comprised of said holes being formed at respective round corners of said inner bobbin.

3. The actuator assembly of claim 2, further comprising said inner bobbin having a gap of at least 0.5 mm formed between each hole and each round corner of said voice coil.

4. The actuator assembly of claim 1, with said outer bobbin having the same height as one of said inner bobbin and said voice coil.

5. A disk drive, comprising:
   an actuator arm rotating about an axis, said actuator arm having a distal end;
   a voice coil member having a voice coil, said voice coil member molded into said distal end;
   inner and outer bobbins made of an insertion-molding material, formed when said voice coil member is molded into said distal end, and positioned respectively at inner and outer sides of said voice coil member;
   said inner bobbin having at least one hole formed at each round corner of said inner bobbin;
   said outer bobbin formed on an entire circumferential outer side of said voice coil without covering a top surface of said voice coil, having a portion fixing said voice coil member to a side wall of said distal end, said portion of said outer bobbin having the same height as said voice coil; and
   an elongated portion formed on said distal end, extending towards said inner bobbin across a bottom of said portion of said outer bobbin, with an extreme portion of said elongated portion protruding between said coil and said inner bobbin and fixing said voice coil member to said distal end of said actuator arm.

6. The disk drive of claim 5, further comprised of a plurality of holes being formed at respective round corners of said inner bobbin.

7. The disk drive of claim 6, further comprising said inner bobbin having a gap of at least 0.5 mm formed between said hole and each round corner of said voice coil.

8. The actuator assembly of claim 5, further comprised of a bending portion extending from said elongated position and being located between said voice coil member and said inner bobbin.

9. The actuator assembly of claim 5, with said outer bobbin having the same height as one of said inner bobbin and said voice coil.

10. An actuator assembly, comprising:
    an actuator arm having a distal end;
    a voice coil member having a voice coil, molded into and fixed to said distal end;
    an inner bobbin made of a first molding material and fixedly attached to a circumferential inner side of said voice coil member;
    a plurality of holes formed at round corners of said inner bobbin other than sides of said inner bobbin during filling inside of said voice coil member with said first molding material;

an outer bobbin made of a second molding material and formed on an entire circumferential outer side of said voice coil when said voice coil member is molded into and fixed to said distal end;

said outer bobbin having a portion disposed between said voice coil member and said distal end, fixing said voice coil member to said distal end when said outer bobbin is formed, said portion of said outer bobbin having the same height as said voice coil;

a protrusion extended from said distal end and disposed on both bottom sides of said portion of said outer bobbin and said voice coil member, supporting said voice coil member; and a bending portion formed on an end of said protrusion and inserted between said voice coil member and said inner bobbin.

11. The actuator assembly of claim 10, further comprised of a plurality of pin members disposed in said respective holes, preventing said voice coil from distorting when said voice coil member is molded into said distal end, and said outer bobbin is formed.

12. The actuator assembly of claim 11, wherein said pin members are removed from said respective holes after said voice coil member has been molded into said distal end.

13. The actuator assembly of claim 10, further comprised of said inner bobbin having a gap between said holes and each round corner of said inner side of said voice coil member.

14. The actuator assembly of claim 13, with said gap being at least 0.5 mm.

15. The actuator assembly of claim 10, with said outer bobbin having the same height and said inner bobbin.

16. The actuator assembly of claim 10, with said outer bobbin having the same height as said inner bobbin and said voice coil.

17. An actuator assembly in a disk drive, comprising
an actuator arm having a distal end;
a voice coil defining a top coil surface, a bottom coil surface substantially parallel to and spaced-apart from said top coil surface by a first height, an inner side, an outer side spaced-apart from said inner side, and an inner space surrounded by said inner side, said top coil surface and said bottom coil surface disposed between said inner side and said outer side;
an inner bobbin formed within said inner space of said voice coil, contacting said inner side of said voice coil, having a second height substantially same as said first height of said voice coil; and
an outer bobbin surrounding an entire circumferential surface of said outer side of said voice coil without contacting said top coil surface of said voice coil, having a top bobbin surface and a bottom bobbin surface both substantially parallel to and spaced-apart from each other by a third height substantially same as said first height of said voice coil, having a portion disposed between said voice coil and said distal end of said actuator arm with an extremity of said portion extending between said voice coil and said inter bobbin, to attach said voice coil to said distal end of said actuator arm, said portion having said third height.

18. The actuator assembly of claim 17, with said inner bobbin comprising a plurality of holes penetrating said inner bobbin from a top of said inner bobbin to a bottom of said inner bobbin.

19. The actuator assembly of claim 18, with said holes being parallel to said inner side of said voice coil and spaced-apart from said inner side of said voice coil by about 0.5 mm.

20. The actuator assembly of claim 17, further comprising a protrusion extended from said distal end and disposed on both said bottom bobbin surface of said outer bobbin and said bottom coil surface of said voice coil to support said voice coil.

21. The actuator assembly of claim 20, further comprising a bending portion formed on an end of said protrusion and inserted between said voice coil and said inner bobbin.

22. The actuator assembly of claim 17, wherein said voice coil is attached to said distal end of said actuator arm by said portion of said outer bobbin without attaching any other additional material to said top bobbin surface of said portion of said outer bobbin.

23. The actuator assembly of claim 17, wherein said first height of said voice coil, said second height of said inner bobbin, and said third height of said outer bobbin are constant through said voice coil, said inner bobbin, and said outer bobbin, respectively.

24. An actuator assembly in a disk drive, comprising:
an actuator arm having a distal end;
a voice coil defining a top coil surface, a bottom coil surface spaced-apart from said top surface by a first height, an inner side, an outer side spaced-apart from said inner side, and an inner space surrounded by said inner side and filled with an inner bobbin having a second height; and
an outer bobbin surrounding said outer side of said voice coil, having a top bobbin surface and a bottom bobbin surface parallel to and spaced-apart from said top bobbin surface by a third height substantially same as said first height of said voice coil, having a portion disposed between said voice coil and said distal end of said actuator arm with an extremity of said portion extending between said voice coil and said inter bobbin, to attach said voice coil to said distal end of said actuator arm without covering said top coil surface of said voice coil, said portion having said third height.

25. The actuator assembly of claim 24, wherein said third height of said outer bobbin is constant and substantially same as one of said first height of said voice coil and said second height of said inner bobbin.

26. The actuator assembly of claim 24, wherein said top bobbin surface of said outer bobbin and said top coil surface of said voice coil are placed on a common plane.

27. The actuator assembly of claim 24, wherein said voice coil is attached to said distal end of said actuator arm by said portion of said outer bobbin while any other material is not added to said top bobbin surface of said portion to make said third height greater than said first height of said voice coil.

28. The actuator assembly of claim 24, with said inner bobbin comprising a plurality of holes penetrating said inner bobbin from a top of said inner bobbin to a bottom of said inner bobbin, said holes being parallel to said inner side of said voice coil and spaced-apart from said inner side of said voice coil.

29. The actuator assembly of claim 24, further comprising:
a protrusion extended from said distal end and disposed on both bottom coil surface of said portion of said outer bobbin and said voice coil to support said voice coil; and
a bending portion formed on an end of said protrusion and inserted between said voice coil and said inner bobbin.

* * * * *